(12) United States Patent
Boyd (10) Patent No.: US 10,900,604 B2
(45) Date of Patent: Jan. 26, 2021

(54) SECURITY BOX (71) Applicant: Perry Martin Boyd, Ellenboro, NC (US)

(72) Inventor: Perry Martin Boyd, Ellenboro, NC (US)

( * ) Notice: Subject to any disclaimer, the term of this patent is extended or adjusted under 35 U.S.C. 154(b) by 44 days.

(21) Appl. No.: 16/297,946

(22) Filed: Mar. 11, 2019

(65) Prior Publication Data

US 2019/0331285 A1  Oct. 31, 2019

Related U.S. Application Data

(60) Provisional application No. 62/662,478, filed on Apr. 25, 2018.

(51) Int. Cl.
*F16L 57/00* (2006.01)

(52) U.S. Cl.
CPC ................... *F16L 57/00* (2013.01)

(58) Field of Classification Search
CPC ............ F16L 57/00; F16L 35/00; B65D 1/00
USPC .......................................................... 285/45
See application file for complete search history.

(56) References Cited

U.S. PATENT DOCUMENTS

| | | | | |
|---|---|---|---|---|
| 849,395 | A | * | 4/1907 | Hinsdill ................. H02G 3/085 220/3.2 |
| 3,106,074 | A | * | 10/1963 | Amburgey, Jr. .......... F25D 3/08 62/464 |
| 4,630,456 | A | * | 12/1986 | Nielsen, Jr. ............. F16K 35/10 285/80 |
| 5,205,592 | A | * | 4/1993 | Ziu ......................... F16L 11/12 285/45 |
| 5,269,568 | A | * | 12/1993 | Courturier ............ G09F 3/0323 285/419 |
| 6,209,574 | B1 | * | 4/2001 | Prewitt .................... F16K 35/10 137/377 |
| 2006/0012164 | A1 | * | 1/2006 | Douglas .................. F16L 58/02 285/45 |
| 2015/0246806 | A1 | * | 9/2015 | Yoo ........................... F23K 5/00 137/312 |

FOREIGN PATENT DOCUMENTS

KR  200488531  *  2/2019  ............. G01M 3/20

OTHER PUBLICATIONS

Bibliographic data for KR200488531 from Korean Patent Office website. (Year: 2020).*

* cited by examiner

*Primary Examiner* — James N Smalley
(74) *Attorney, Agent, or Firm* — NK Patent Law (57) ABSTRACT

A security box for a pipe assembly includes a chest having a first wall and a second wall, together at least partially defining an interior, and a lid configured to engage the chest. The lid has an open position relative to the chest for permitting access to the interior of the chest, and a closed position in which the lid at least partially restricts access to the interior of the chest. At least when the lid is in the closed position, a first hole defined at least partially in the first wall aligns with a second hole defined at least partially in the second wall. The first hole and the second hole are defined at opposite ends of the security box. The holes are defined in part by cutouts defined in edges of the walls of chest and in part by cutouts defined in edges of the lid.

18 Claims, 7 Drawing Sheets

SECURITY BOX

CROSS-REFERENCE TO RELATED APPLICATION

This application claims the benefit of priority of U.S. provisional patent application No. 62/662,478, titled "Security Box," filed on Apr. 25, 2018, which is incorporated herein in its entirety by this reference.

TECHNICAL FIELD

The present disclosure relates to security enclosures. More particularly, the present disclosure relates to security boxes for protecting a pipe assembly.

BACKGROUND

Equipment items at construction sites, temporary facilities, and event locations are sometimes stolen, vandalized, or damaged accidently. Pipe assemblies, for example, may be used to connect contractor equipment at construction sites to municipal water supplies. Water pipe assemblies can include meters, flow preventers, valves and other components that have resell values when stolen. Even the piping segments that interconnect such components have salvage value as raw materials including copper and brass.

Some construction projects can proceed for weeks or months. While some form of security is typically deployed, for example at least site-perimeter fencing and sometimes active guard presence, pipe assemblies are not typically particularly or individually protected and general construction site practices are sometimes leaving these substantial investments vulnerable. Improved security measures are thus needed to protect such pipe assemblies.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a security box for securing a pipe assembly includes: a chest including at least a first wall portion and a second wall portion together at least partially defining an interior; and a lid configured to engage the chest, the lid having an open position relative to the chest for permitting access to the interior of the chest, and a closed position in which the lid at least partially restricts access to the interior of the chest. At least when the lid is in the closed position, a first hole defined at least partially in the first wall portion of the chest aligns with a second hole defined at least partially in the second wall portion of the chest.

The first hole and the second hole may be defined at opposite ends of the security box.

The first hole may be defined, when the lid is in the closed position, in part by a cutout defined in an edge of the first wall portion of the chest and in part by a cutout defined in a first edge portion of the lid.

The second hole may be defined, when the lid is in the closed position, in part by a cutout defined in an edge of the second wall portion of the chest and in part by a cutout defined in a second edge portion of the lid.

The first wall portion of the chest and the second wall portion of the chest may be planar and parallel.

The chest may have a rectangular box form, and wherein the lid has a rectangular box form.

The cutout defined in the edge of the first wall portion of the chest may be semicircular, and the cutout defined in a first edge portion of the lid may be semicircular. Accordingly, the first hole, defined when the lid is in the closed position, may be generally circular. The second hole may be generally circular.

A liner portion may be mounted along at least one edge of the first hole for cushioning a pipe assembly.

At least one baffle panel may be mounted in the interior of the chest.

The chest may include a front wall and a parallel rear wall each extending from the first wall portion to the second wall portion. The first wall portion and the second wall portion may be parallel. The chest may define a rectangular box.

At least one baffle panel may extend within the interior of the chest from the front wall to the rear wall.

At least one support bracket may be mounted in the interior of the chest for supporting a pipe assembly.

The support bracket may span the interior of the chest between opposing walls of the chest.

A handle may be mounted on an exterior of the chest.

A hinge may pivotally connect the lid to the chest.

The hinge and a locking element may be mounted on the chest along opposite walls, thereby securely protecting the interior when the lid is in the closed position and the locking element is locked.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Figure 1A:
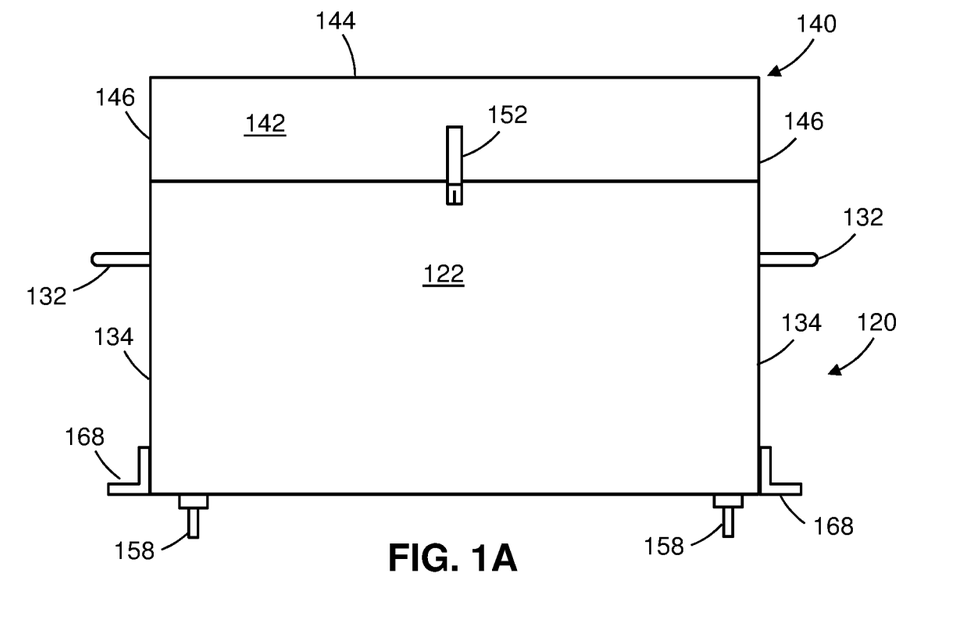
FIG. 1A is a front elevation view of a security box for pipe assemblies according to at least one embodiment.
Figure 1B:
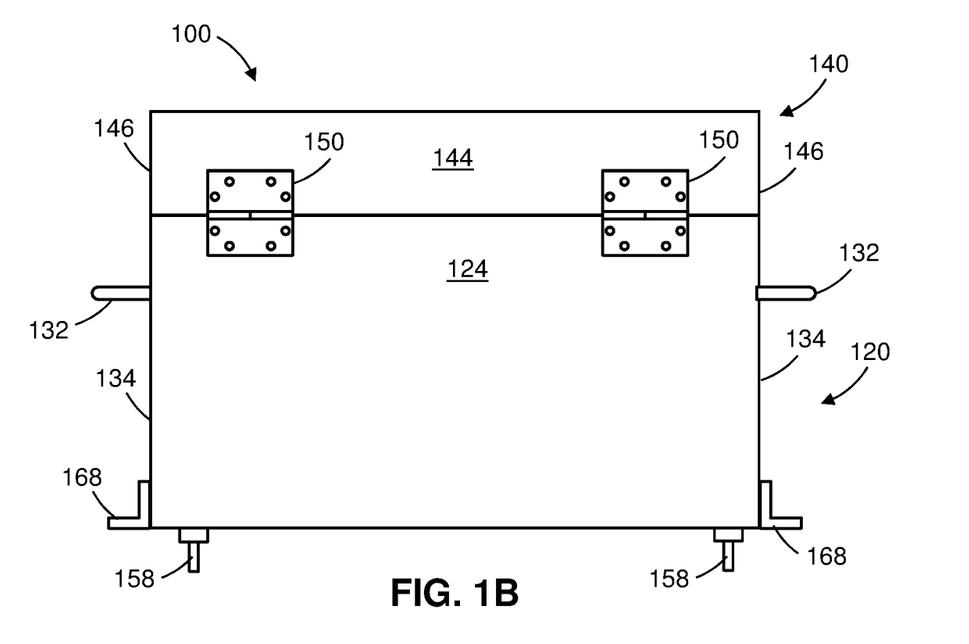
FIG. 1B is a rear elevation view of the security box of FIG. 1A.

A security box 100 according to at least one embodiment is shown in front view in FIGS. 1A and 1n rear view in FIG. 1B. The security box 100 includes a lower main chest 120 and a hinging top lid 140. The lower main chest 120 has a generally planar floor 102; and four planar vertical outer walls, including a front wall 122 (FIG. 1A), a rear wall 124 (FIG. 1B), and two sidewalls 134, one of which is expressly illustrated in FIGS. 4A and 4B. The top lid 140 has a generally planar top panel 138; and four planar vertical outer walls, including a front wall 142 (FIG. 1A), a rear wall 144 (FIG. 1B), and two sidewalls 146, one of which is expressly illustrated in FIGS. 4A and 4B. In the illustrated embodiment of the security box 100, both the lower main chest 120 and the top lid 140 have generally rectangular box forms, in which the front wall of each is parallel to the rear wall thereof, and in which the sidewalls are parallel.

Figure 2A:
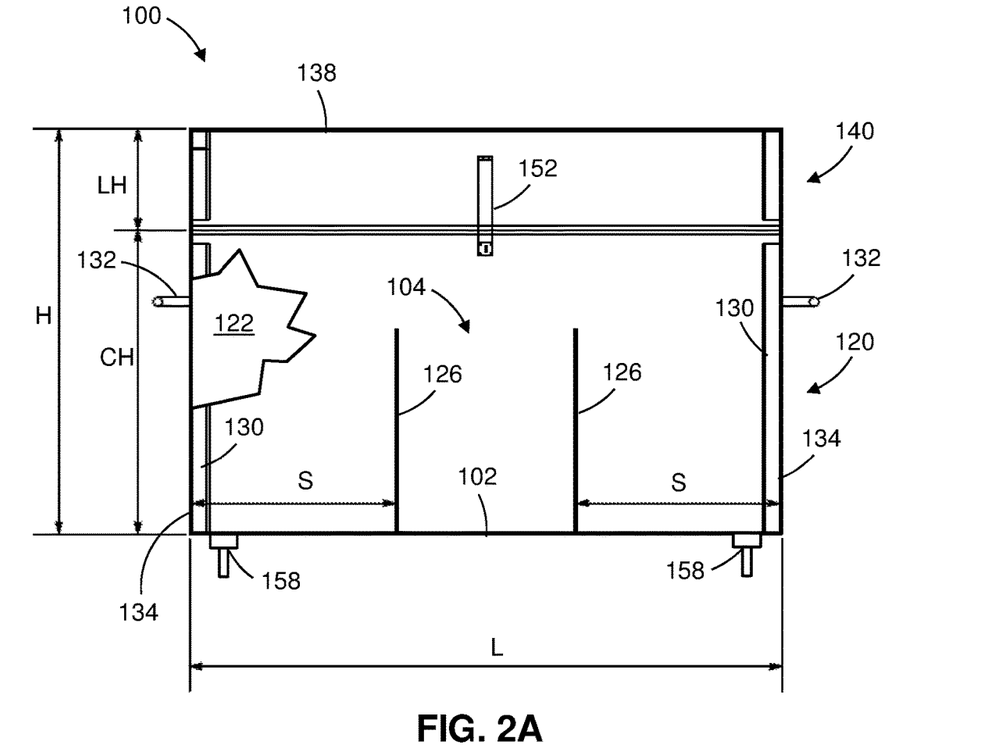
FIG. 2A is a front elevation view of the security box of FIG. 1A, shown with portions of a front wall thereof as transparent for illustration of the interior.

FIG. 2A is a front elevation view of the security box 100, shown with portions of the front wall 122 of the lower main chest 120, and the entirety of the front wall of the top lid 140, as transparent for illustration of their interiors. Two standing parallel baffle panels 126 divide a lower portion of the interior 104 of the main chest 120 into three lower chambers. As shown for example in FIG. 6A, each baffle panel 126 spans the interior of the main chest 120 from the front wall 122 to the rear wall 124, adding strength and rigidity to the main chest 120. The main chest 120, in the illustrated embodiment, is strengthened by brace elements 130 along the junctions of the walls. The brace elements 130 are shown as square bar segments. Other brace element embodiments, such as L-channel segments, are within the scope of these descriptions. The baffle panels 126 and brace elements 130 are shown as visible though the sidewalls of the security box 100 in FIGS. 2A-2B, FIGS. 3A-3B, and FIG. 5 for illustration purposes. The brace elements 130 may be welded of otherwise affixed to the inside of the main chest 120 along the corner junctions.

Figure 3A:
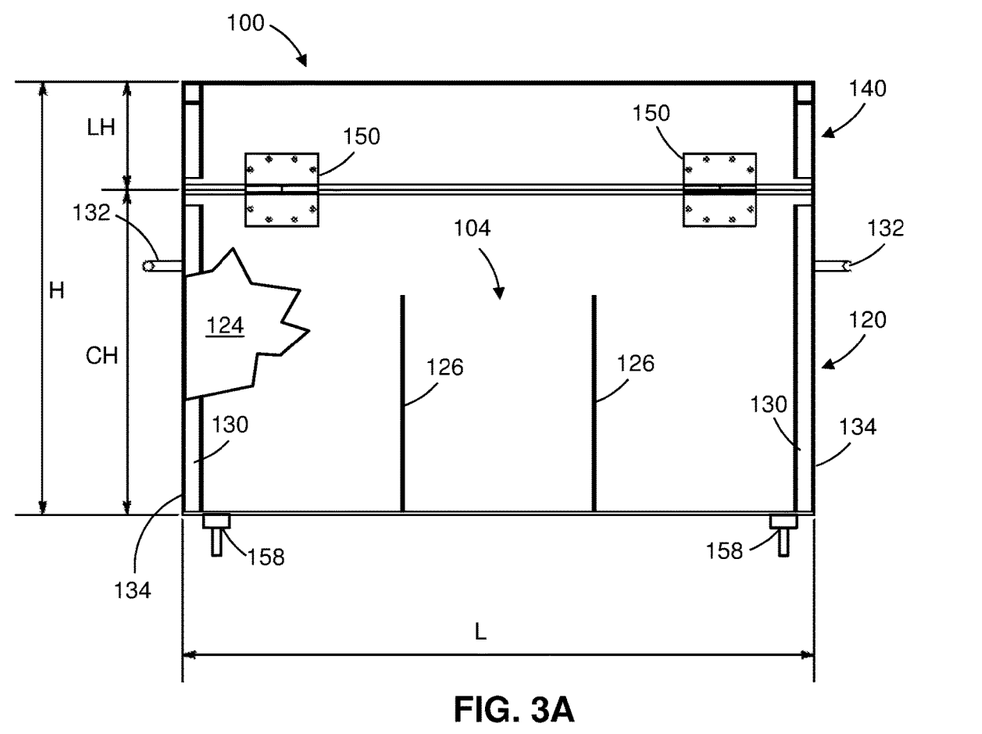
FIG. 3A is a rear elevation view of the security box of FIG. 1A, shown with portions of a rear wall thereof as transparent for illustration of the interior.
Figure 3B:
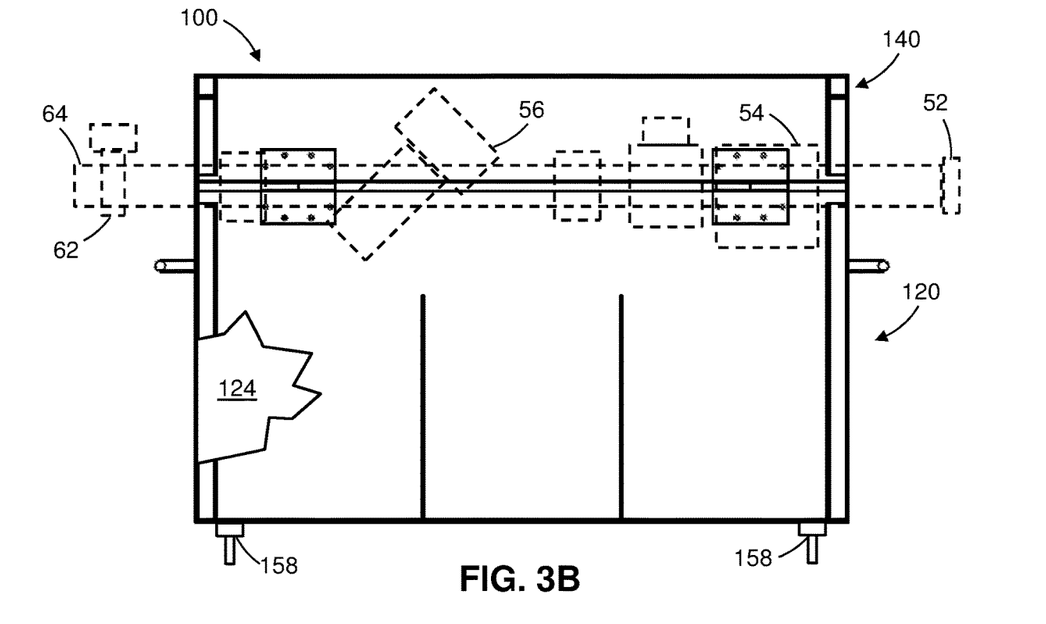
FIG. 3B is a rear elevation view of the security box as in FIG. 3A, shown with the pipe assembly of FIG. 2B according to at least one embodiment.

As shown in FIG. 3A, the top lid 140 is pivotally connected to the main chest 120 at the junction of their rear walls by one or more hinges 150. A locking element 152, such as a latch or a hasp that receives or includes a lock, having cooperating components attached respectively to the top lid 140 and main chest 120, is shown in FIG. 1A. The locking element 152 facilitates secure closure of the top lid 140 upon the main chest 120 to protect the interior and any pipe assembly therein from theft, vandalism, and tampering. In the illustrated embodiment, the locking element 152 (FIG. 1A) and the hinges 150 (FIG. 1B) are mounted on the main chest 120 upon opposite walls, particularly the front wall 122 and rear wall 124, so as to securely protect the interior of the security box when the top lid 140 is in its closed position and the locking element 152 is locked.

The top lid 140, in the illustrated embodiment, is strengthened by brace elements 136 (FIG. 5) along the junctions of the walls and top panel 138. The brace elements 136 may be square bar segments or L-channel segments for example. The brace elements 136 may be welded of otherwise affixed to the inside of the top lid 140 along the corner junctions. Other brace element embodiments are within the scope of these descriptions.

A respective handle 132 (FIG. 1A) extends from each of two lateral end sidewalls 134 of the main chest 120 in the illustrated embodiment of the security box 100. The handles 132 may hinge from the lateral end sidewalls 134 to facilitate their deployment when needed and their stowing at other times. The security box 100 and its contents can be conveniently carried by use of the handles 132.

Figure 2B:
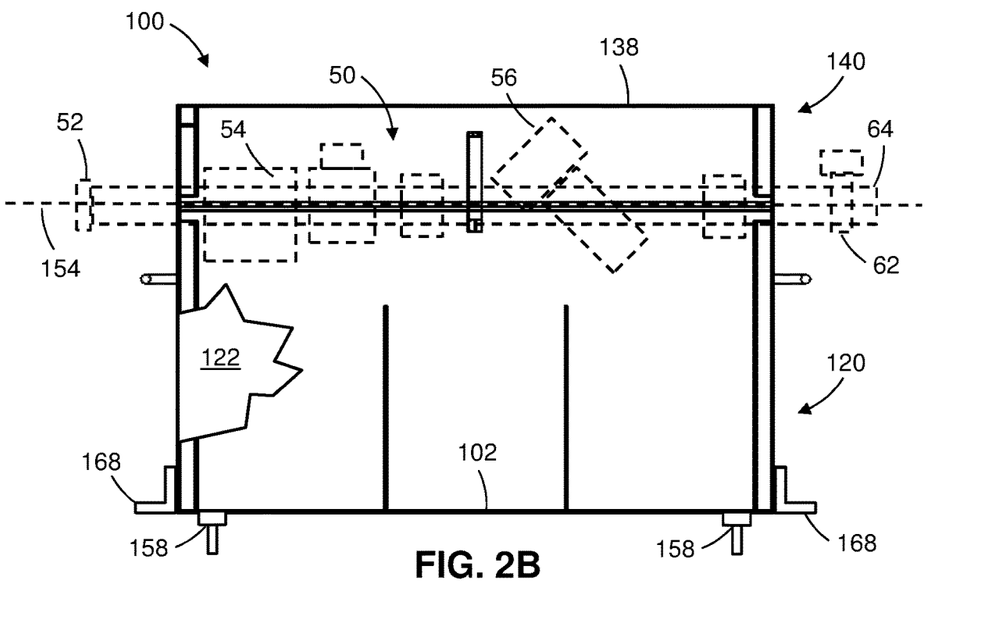
FIG. 2B is a front elevation view of the security box as in FIG. 2A, shown with a pipe assembly in dashed line, according to at least one embodiment, to exemplify use of the security box.

The security box 100 is shown in FIG. 2B with a pipe assembly according to at least one embodiment shown in dashed line to exemplify use of the security box. The security box 100 is particularly well designed for use in protecting pipe assemblies. For example, the pipe assembly 50 (FIG. 2B) may include, at the upstream end, an input side connector or pipe end 52 for receiving water from a supply such as a hydrant, pipe or other conduit. A meter 54 is shown for measuring, recording, and transmitting water use parameters. The pipe assembly 50 is also shown to include a back-flow preventer 56. The pipe assembly 50 is shown to include multiple valves 60 (FIG. 6A) having respective handles. At the downstream end, the illustrated pipe assembly has an output side gate valve 62 and an output connector or pipe end 64. Various pipe sections along the pipe assembly 50 are also shown connecting the components from the input side connector or pipe end 52 to the output side connector or pipe end 64.

In use, the input side connector or pipe end 52 can be coupled to a water supply and water can be provided through the pipe assembly 50 to the output side connector or pipe end 64 for use at a construction site, a work site, or any facility or location as needed. The components and their arrangements illustrated and described are provided as examples. Other examples of pipe assemblies may vary. The examples thus given directly and implied show that valuable components and materials are invested in such pipe assemblies and their theft or vandalism can be prevented by the security box 100. Not only are intentional damages thwarted, incidental breakages are also prevented where vehicles, equipment, and materials are moved about and accidental collisions can occur. The security box 100 can also serve advantageously as a protective carrying chest or case for a pipe assembly.

Figure 4A:
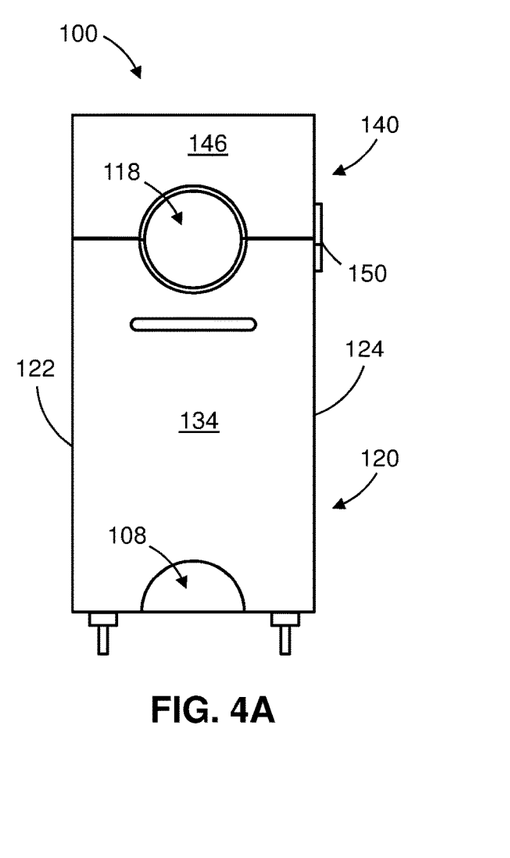
FIG. 4A is a side elevation view of the security box of FIG. 1A.

Side holes 118 (FIGS. 4A, 5) are defined to accommodate the pipe assembly 50 at each end of the security box 100, even in the closed configuration of FIG. 4A. At each end of the main chest 120, an upward opening semicircular cutout 128 (FIG. 4B) is formed in the top edge of the lateral-end sidewall 134. Similarly, at each end of the top lid 140, a downward opening semicircular cutout 148 is formed in the bottom edge of the end sidewall 146. When the top lid 140 is closed upon the main lower chest 120, the cutouts 128 and 148 (FIG. 4B) at each end form a circular hole 118 (FIG. 4A) to accommodate the pipe assembly 50, or more particularly, to accommodate the pipe sections leading into the security box 100 from the input connector or pipe end 52 and output connector or pipe end 64. The side holes 118 at each lateral end of the security box 100 are aligned along an axis 154, which is parallel to the front wall 122 and rear wall 124, so as to accommodate a pipe assembly 50 having pipe sections extending along a common axis.

Figure 4B:
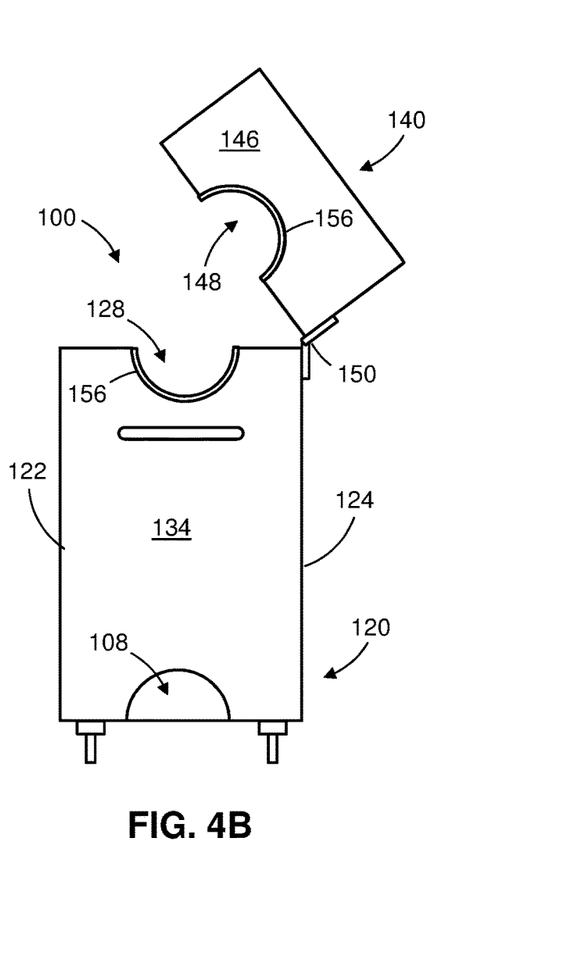
FIG. 4B is a side elevation view of the security box of FIG. 1A, shown with a top lid thereof in a hinged open position.

Additional drainage cutouts 108 may be provided at the lower ends of the sidewalls as shown in FIGS. 4A-4B for example. Drainage cutouts and holes may be provided in other locations or in the floor of the main chest 120 in other embodiments.

Figure 6A:
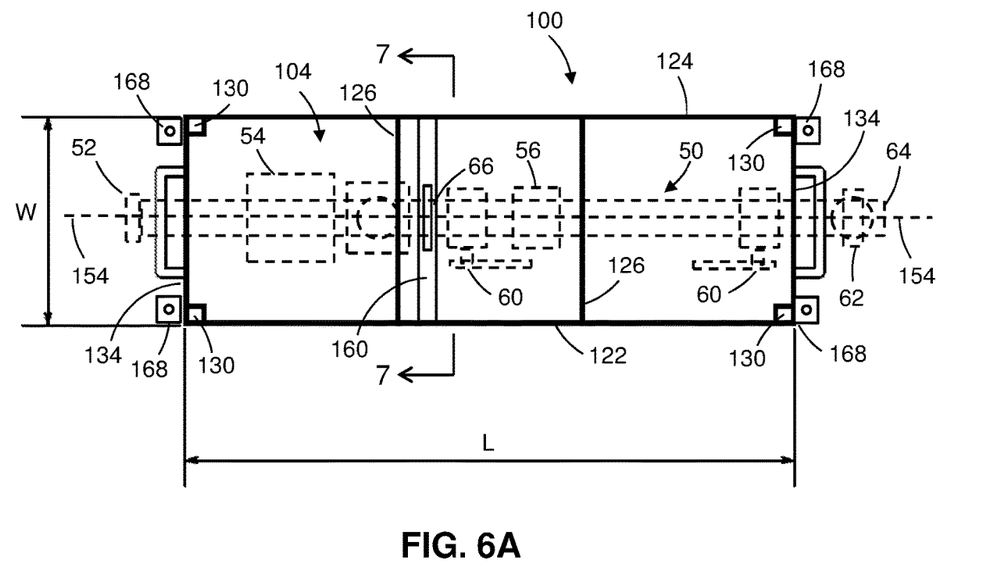
FIG. 6A is a plan view of the security box of FIG. 1A, shown without the lid, and shown with the pipe assembly of FIG. 2B in dashed line to exemplify use of the security box.

As shown in the drawings, the security box 100 may include legs 158, for example one at each of the four bottom corners of the main chest 120. The legs 158 may be adjustable to facilitate leveling of the security box 100 on non-level surfaces. The security box 100 may be staked to the ground, for example via the legs or other connection elements. The security box 100 may include clips 168 for attaching the box to a surface. The clips 168 are shown in FIGS. 1B and 6A as L-shaped clips attached to the outside walls of the box at the corners and having holes in their horizontal parts for stakes or bolts or other connectors.

Figure 6B:
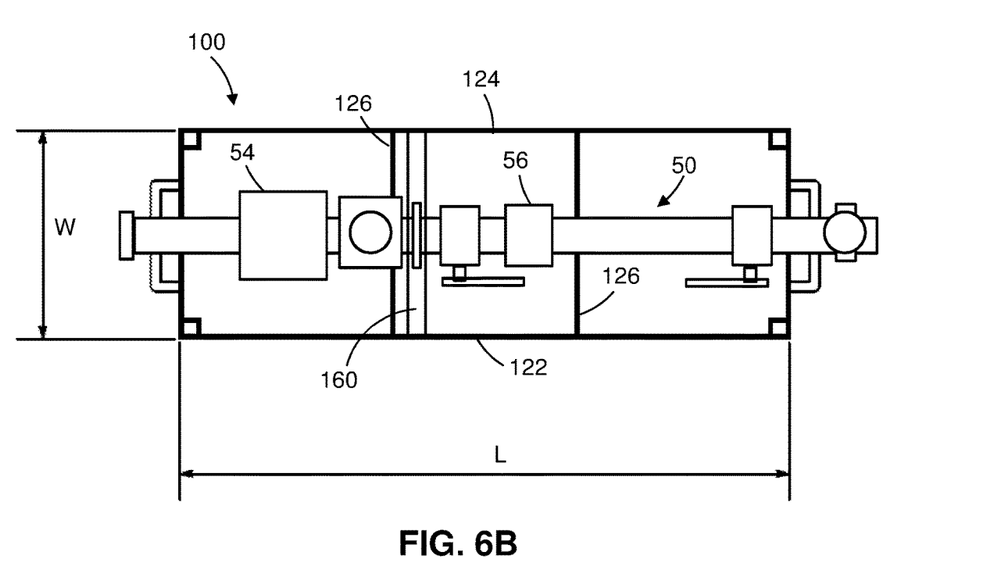
FIG. 6B is a plan view as in FIG. 6A, shown with the pipe assembly in solid line to exemplify at least one embodiment of recited structure in which the pipe assembly is expressly a part.
Figure 7:
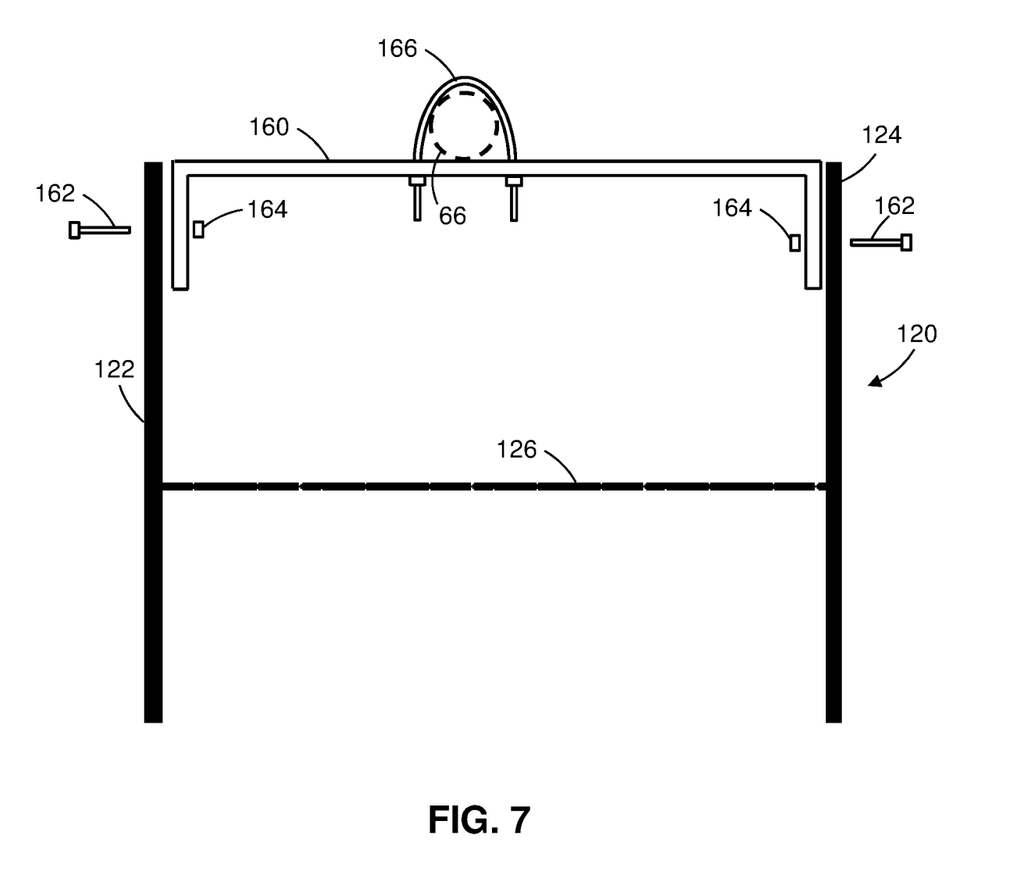
FIG. 7 is a partial cross-section elevation view taken at the line 7-7 in FIG. 6A.

A support bracket 160 is shown in FIG. 7 as spanning the interior of the main chest 120 between the front wall 122 and rear wall 124. In the illustrated embodiment, connectors 162, such as threaded bolts that engage nuts 164, are shown to secure the ends of the bracket 160 to the interior of the security box. The bracket may be alternatively or additionally welded to the walls of the security box 100. The support bracket 160 includes a clasp 166, shown as a two-ended U-bolt or connector or clamp, for secures a pipe section 66 (FIGS. 6A, 7) of the pipe assembly 50 (FIG. 6A-6B) to the support bracket 160 so as to support and secure the pipe assembly.

Various materials may be used in various embodiments. The main chest 120, top lid 140, and baffle panels 126 may be constructed for example of aluminum, which is relatively light and durable. The brace elements 130 may also be constructed, for example, of aluminum. Other materials are within the scope of these descriptions. For example, steel can be used to construct the security box 100. Angle iron can be used to construct the brace elements 130.

Liners 156 (FIG. 2) may be provided in at least one embodiment, for example mounted along the edges of the cutouts 128 in the main chest 120 and cutouts 148 in the top lid 140 that form the side holes 118 for receiving end sections of a pipe assembly 50. The liners can be rubber, rubberized, polymers, plastic, or other materials to protect sections of the pipe assembly 50 from damage or wear wherever contact is made with the security box 100. Lining material may also be provided along contacting edges of the main chest 120 and top lid 140.

Figure 5:
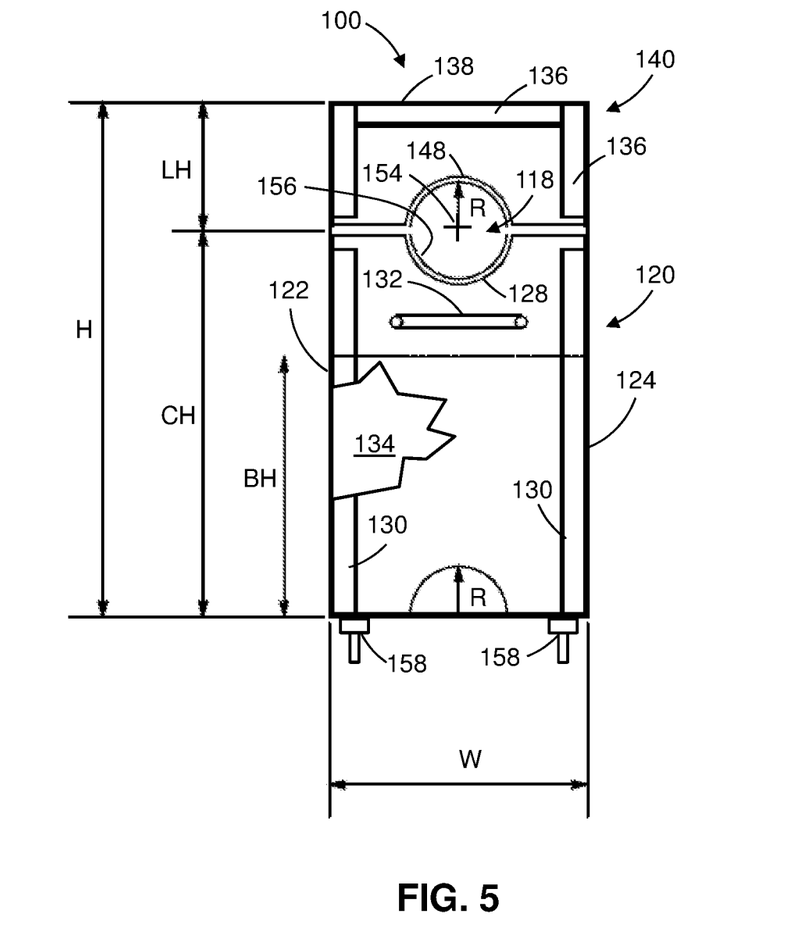
FIG. 5 is a side elevation view of the security box as in FIG. 4A, shown with portions of sidewalls thereof as transparent for illustration of the interior.

Exemplary dimensions are provided below, with reference here to FIG. 3A and FIG. 5. These dimensions are provided to exemplify at least one embodiment of the security box 100 without limiting all embodiments thereof to such dimensions.

Total height H=24 inches
Total length L=35 inches
Total width W=12 inches
Main chest 120 height CH=18 inches
Baffle panel height BH=12 inches
Side hole radius R=2¼ inches
Sidewall to baffle panel spacing S=12 inches
Top lid 140 height LH=6 inches Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A security box for securing a pipe assembly, the security box comprising:
a chest having an interior, the chest comprising a first wall portion, a second wall portion, a front wall and a rear wall, the front wall and rear wall each extending from the first wall portion to the second wall portion;
a panel adding strength and rigidity to the chest, the panel extending within the interior of the chest from the front wall to the rear wall; and
at least one support bracket for supporting a pipe assembly, the support bracket spanning the interior of the chest between the front wall and the rear wall, the support bracket including a clasp for securing a pipe assembly when supported by the support bracket;
a lid configured to engage the chest, the lid having an open position relative to the chest for permitting access to the interior of the chest, and a closed position in which the lid at least partially restricts access to the interior of the chest,
wherein, at least when the lid is in the closed position, a first hole defined at least partially in the first wall portion of the chest aligns with a second hole defined at least partially in the second wall portion of the chest.

2. The security box of claim 1, wherein the first hole and the second hole are defined at opposite ends of the security box.

3. The security box of claim 1, wherein the first hole is defined, when the lid is in the closed position, in part by a cutout defined in an edge of the first wall portion of the chest and in part by a cutout defined in a first edge portion of the lid.

4. The security box of claim 3, wherein the second hole is defined, when the lid is in the closed position, in part by a cutout defined in an edge of the second wall portion of the chest and in part by a cutout defined in a second edge portion of the lid.

5. The security box of claim 4, wherein the first wall portion of the chest and the second wall portion of the chest are planar and parallel.

6. The security box of claim 5, wherein the chest has a rectangular box form, and wherein the lid has a rectangular box form.

7. The security box of claim 4, wherein:
the cutout defined in the edge of the first wall portion of the chest is semicircular;

the cutout defined in the first edge portion of the lid is semicircular; and the first hole, defined when the lid is in the closed position, is generally circular.

8. The security box of claim 7, wherein the second hole is generally circular.

9. The security box of claim 1, further comprising at least one liner portion mounted along at least one edge of the first hole for cushioning a pipe assembly.

10. The security box of claim 1, wherein:

the first wall portion and the second wall portion are parallel; and the chest defines a rectangular box.

11. The security box of claim 1, further comprising at least one handle on an exterior of the chest.

12. The security box of claim 1, further comprising at least one hinge by which the lid is pivotally connected to the chest.

13. The security box of claim 12, further comprising a locking element, wherein the at least one hinge and locking element are mounted on the chest along opposite walls, thereby securely protecting the interior when the lid is in the closed position and the locking element is locked.

14. The security box of claim 1, wherein the chest comprises at least one drainage cutout formed through a lower end of at least one of the first wall portion, the second wall portion, the front wall, and the rear wall.

15. The security box of claim 1, further comprising a second panel adding strength and rigidity to the chest, the second panel extending within the interior of the chest from the front wall portion to the rear wall portion, the second panel being parallel to said panel, said panel and said second panel dividing a lower portion of the interior of the chest into three lower chambers.

16. The security box of claim 1, wherein the support bracket is secured at respective ends thereof to the front wall and rear wall independently of the panel.

17. The security box of claim 1, wherein the support bracket and panel are separate structures.

18. The security box of claim 1, wherein the support bracket is spaced from the panel.

* * * * *